US012667797B2

(12) United States Patent
Gasior et al.

(10) Patent No.: US 12,667,797 B2
(45) Date of Patent: Jun. 30, 2026

(54) REFRIGERATOR APPLIANCE INCLUDING A WATER FILTER WITH WIRELESS POWER TRANSFER

(71) Applicant: Haier US Appliance Solutions, Inc., Wilmington, DE (US)

(72) Inventors: Bradford Gasior, Louisville, KY (US); Gregory Sergeevich Chernov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 550 days.

(21) Appl. No.: 18/164,899

(22) Filed: Feb. 6, 2023

(65) Prior Publication Data

US 2024/0261709 A1      Aug. 8, 2024

(51) Int. Cl.
| | |
|---|---|
| *B01D 29/11* | (2006.01) |
| *F25D 23/12* | (2006.01) |
| *H04B 7/24* | (2006.01) |

(52) U.S. Cl.
CPC .......... *B01D 29/117* (2013.01); *F25D 23/126* (2013.01); *H04B 7/24* (2013.01); *B01D 2201/56* (2013.01); *F25D 2323/121* (2013.01)

(58) Field of Classification Search
CPC .. B01D 29/117; B01D 29/11; B01D 2201/56; H04B 7/24; F25D 23/126; F25D 23/062; F25D 23/12; F25D 2323/121
USPC ........................................................ 210/435
See application file for complete search history.

(56) References Cited

U.S. PATENT DOCUMENTS

| | | | |
|---|---|---|---|
| 9,620,996 | B2 | 4/2017 | Zeine et al. |
| 10,406,461 | B2 | 9/2019 | Bippus et al. |
| 10,450,203 | B2 | 10/2019 | Schuster |
| 10,946,319 | B2 | 3/2021 | Bippus et al. |
| 11,025,447 | B2 | 6/2021 | Ebrom et al. |
| 2016/0301259 | A1* | 10/2016 | Zeine ........................ H02J 7/04 |
| 2016/0340207 | A1* | 11/2016 | Schuster ................ C02F 1/003 |
| 2017/0050130 | A1* | 2/2017 | Bippus .................. F25D 23/126 |
| 2019/0109723 | A1* | 4/2019 | Ebrom .................... H05B 6/688 |
| 2020/0306671 | A1* | 10/2020 | Subrahmanya ....... F25D 23/126 |
| 2022/0154989 | A1* | 5/2022 | Kim .......................... F25C 5/08 |

FOREIGN PATENT DOCUMENTS

| | | |
|---|---|---|
| CN | 111442602 A | 7/2020 |
| EP | 3242376 B1 | 8/2019 |
| KR | 101566282 B1 | 11/2015 |

* cited by examiner

*Primary Examiner* — Akash K Varma
(74) *Attorney, Agent, or Firm* — Dority & Manning, P.A.

(57) ABSTRACT

A water filter for a refrigerator appliance including a transmitter power coil. The water filter includes a body forming a liquid receiving space; a filter material provided within the receiving space to filter water therethrough; a first antenna attached to the body, the first antenna facilitating a wireless communication between the refrigerator appliance and the water filter; a power harvesting circuit attached to the body, the power harvesting circuit being operably connected with the first antenna; and one or more electronic components operably coupled to the power harvesting circuit, wherein the antenna wirelessly receives a first electromagnetic field from the transmitter power coil to provide power to the one or more electronic components via the power harvesting circuit.

9 Claims, 5 Drawing Sheets

REFRIGERATOR APPLIANCE INCLUDING A WATER FILTER WITH WIRELESS POWER TRANSFER

FIELD OF THE INVENTION

The present subject matter relates generally to refrigerator appliances, and more particularly to water filters within refrigerator appliances.

BACKGROUND OF THE INVENTION

Refrigerator appliances include a chilled chamber for storing chilled items and a freezing chamber for storing frozen items. Some refrigerator appliances include a water supply for selectively releasing water on demand via a dispenser. In such appliances, a water filter may be fluidly connected with the water supply to filter the water supplied to the dispenser. Such filters may include one or more features that require power, such as various lights, sensors, or filtration means. Conventionally, power is transferred or supplied to such water filters via electric contacts.

However, drawbacks exist to such power transfer methods. Accordingly, such contacts are exposed within the chilled chamber and subject to contact with water or other items provided within the chilled chamber. The contacts may become corroded or malfunction due to foreign debris within the chilled chamber. Accordingly, a refrigerator appliance that obviates one or more of the above-mentioned drawbacks would be beneficial. In particular, a refrigerator appliance and water filter assembly facilitating wireless communication would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a water filter for a refrigerator appliance is provided. The refrigerator appliance may include a transmitter power coil. The water filter may include a body forming a liquid receiving space and an electronics compartment; a filter material provided within the liquid receiving space to filter water therethrough; a first antenna provided within the electronics compartment, the first antenna facilitating a wireless communication between the refrigerator appliance and the water filter; a power harvesting circuit provided within the electronics compartment, the power harvesting circuit being operably connected with the first antenna; and one or more electronic components operably coupled to the power harvesting circuit. The first antenna may wirelessly receive a first electromagnetic field from the transmitter power coil to provide power to the one or more electronic components via the power harvesting circuit.

In another exemplary aspect of the present disclosure, a refrigerator appliance is provided. The refrigerator appliance may include a cabinet; a food storage chamber defined in the cabinet; a filter dock provided within the food storage chamber; a transmitter power coil provided at the filter dock; and a water filter removably coupled to the filter dock. The water filter may include a body forming a liquid receiving space and an electronics compartment; a filter material provided within the liquid receiving space to filter water therethrough; a first antenna provided within the electronics compartment, the first antenna facilitating a wireless communication between the refrigerator appliance and the water filter; a power harvesting circuit provided within the electronics compartment, the power harvesting circuit being operably connected with the first antenna; and one or more electronic components operably coupled to the power harvesting circuit. The first antenna may wirelessly receive a first electromagnetic field from the transmitter power coil to provide power to the one or more electronic components via the power harvesting circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
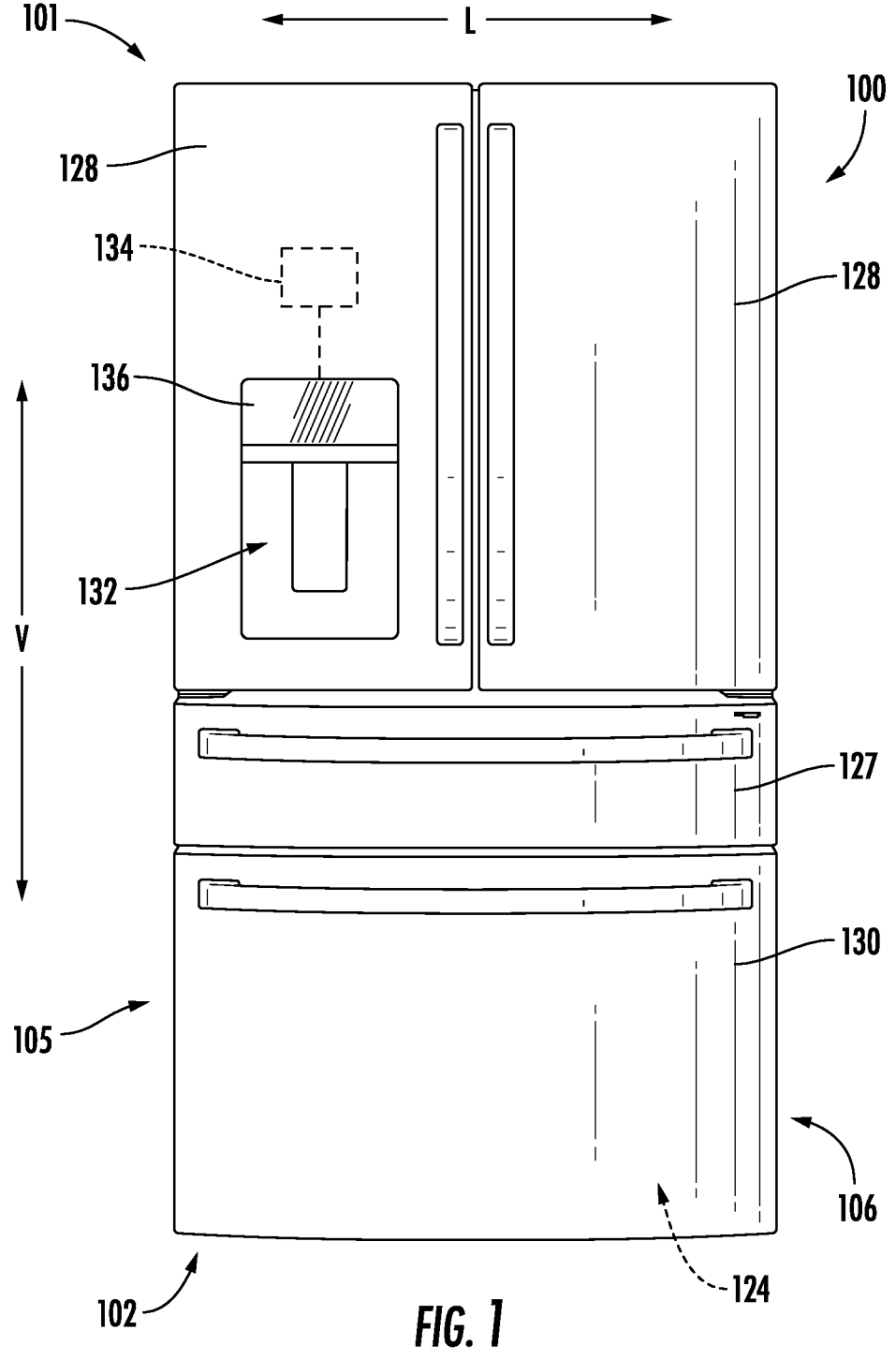
FIG. 1 provides a front view of a refrigerator appliance according to an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
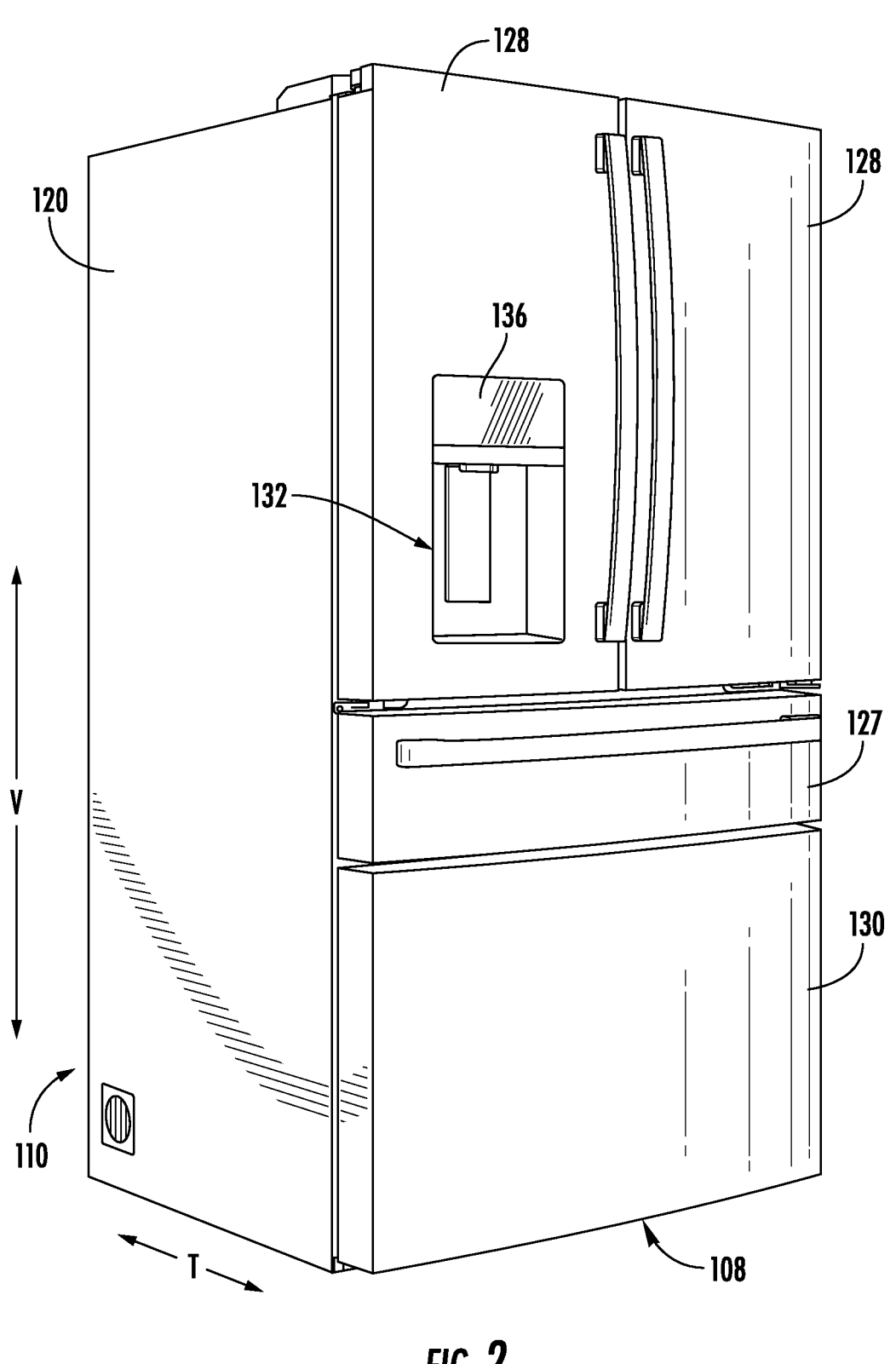
FIG. 2 provides a perspective view of the refrigerator appliance of FIG. 1.
Figure 3:
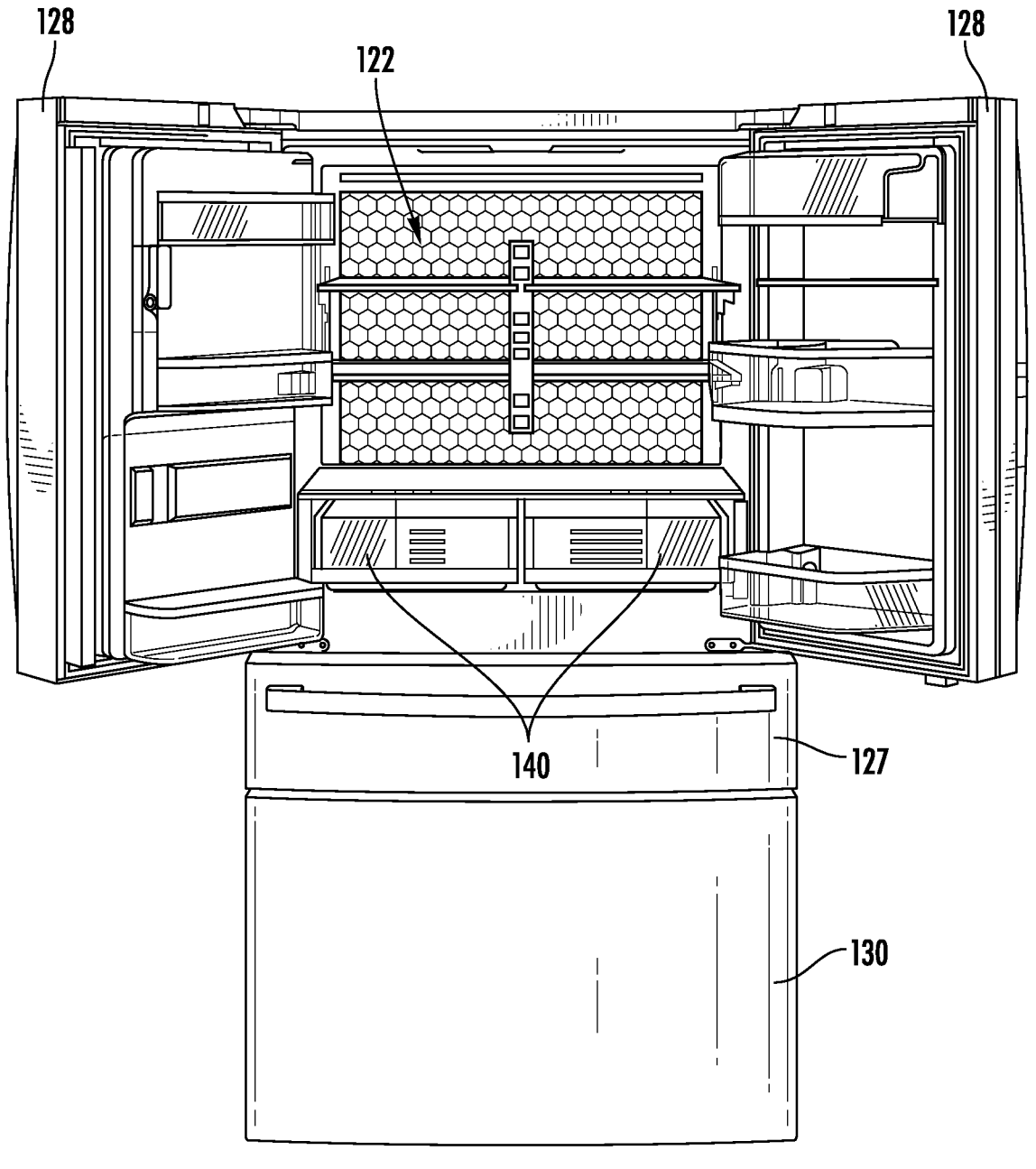
FIG. 3 provides a front view of the refrigerator appliance of FIG. 1 with doors in an open position.

FIG. 1 is a front view of an exemplary embodiment of a refrigerator appliance 100. FIG. 2 is a perspective view of the refrigerator appliance 100. FIG. 3 is a front view of the refrigerator appliance 100 with fresh food doors 128 thereof in an open position. Refrigerator appliance 100 extends between a top 101 and a bottom 102 along a vertical direction V. Refrigerator appliance 100 also extends between a first side 105 and a second side 106 along a lateral direction L. As shown in FIG. 2, a transverse direction T may additionally be defined perpendicular to the vertical and lateral directions V, L. Refrigerator appliance 100 extends along the transverse direction T between a front portion 108 and a back portion 110.

Refrigerator appliance 100 may include a cabinet or housing 120 defining an upper fresh food chamber 122 (FIG. 3) and a lower freezer chamber or frozen food storage chamber 124 arranged below the fresh food chamber 122 along the vertical direction V. An auxiliary food storage chamber may be positioned between the fresh food storage chamber 122 and the frozen food storage chamber 124, e.g., along the vertical direction V. Because the frozen food storage chamber 124 is positioned below the fresh food storage chamber 122, refrigerator appliance 100 may be generally referred to as a bottom mount refrigerator. In the exemplary embodiment, housing 120 may also define a mechanical compartment (not shown) for receipt of a sealed cooling system (not shown). Using the teachings disclosed herein, one of ordinary skill in the art will understand that the present technology can be used with other types of refrigerators (e.g., side-by-side) or a freezer appliance as well. Consequently, the description set forth herein is for illustrative purposes only and is not intended to limit the technology in any aspect.

Refrigerator doors 128 may each be rotatably hinged to an edge of housing 120 for accessing fresh food chamber 122. It should be noted that while two doors 128 in a "French door" configuration are illustrated, any suitable arrangement of doors utilizing one, two or more doors is within the scope and spirit of the present disclosure. A freezer door 130 may be arranged below refrigerator doors 128 for accessing freezer chamber 124. In the exemplary embodiment, freezer door 130 is coupled to a freezer drawer (not shown) slidably mounted within freezer chamber 124. An auxiliary door 127 may be coupled to an auxiliary drawer which may be slidably mounted within the auxiliary chamber.

Operation of the refrigerator appliance 100 can be regulated by a controller 134 that is operatively coupled to a user interface panel 136. User interface panel 136 may provide selections for user manipulation of the operation of refrigerator appliance 100 to modify environmental conditions therein, such as temperature selections, etc. In some embodiments, user interface panel 136 is proximate a dispenser assembly 132. In response to user manipulation of the user interface panel 136, the controller 134 may operate various components of the refrigerator appliance 100. Operation of the refrigerator appliance 100 may be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods and associated method steps as disclosed herein.

The controller 134 may be positioned in a variety of locations throughout refrigerator appliance 100. In the illustrated embodiment, the controller 134 is located within the door 128. In such an embodiment, input/output ("I/O") signals may be routed between the controller and various operational components of refrigerator appliance 100. In one embodiment, the user interface panel 136 represents a general purpose I/O ("GPIO") device or functional block. In one embodiment, the user interface 136 includes input components, such as one or more of a variety of electrical, mechanical or electro-mechanical input devices including rotary dials, push buttons, and touch pads. The user interface 136 may include a display component, such as a digital or analog display device designed to provide operational feedback to a user. For example, the user interface 136 may include a touchscreen providing both input and display functionality. The user interface 136 may be in communication with the controller via one or more signal lines or shared communication busses.

Using the teachings disclosed herein, one of skill in the art will understand that the present subject matter can be used with other types of refrigerators such as a refrigerator/ freezer combination, side-by-side, bottom mount, compact, and any other style or model of refrigerator appliance. Accordingly, other configurations of refrigerator appliance 100 could be provided, it being understood that the configurations shown in the accompanying FIGS. and the description set forth herein are by way of example for illustrative purposes only.

Figure 4:
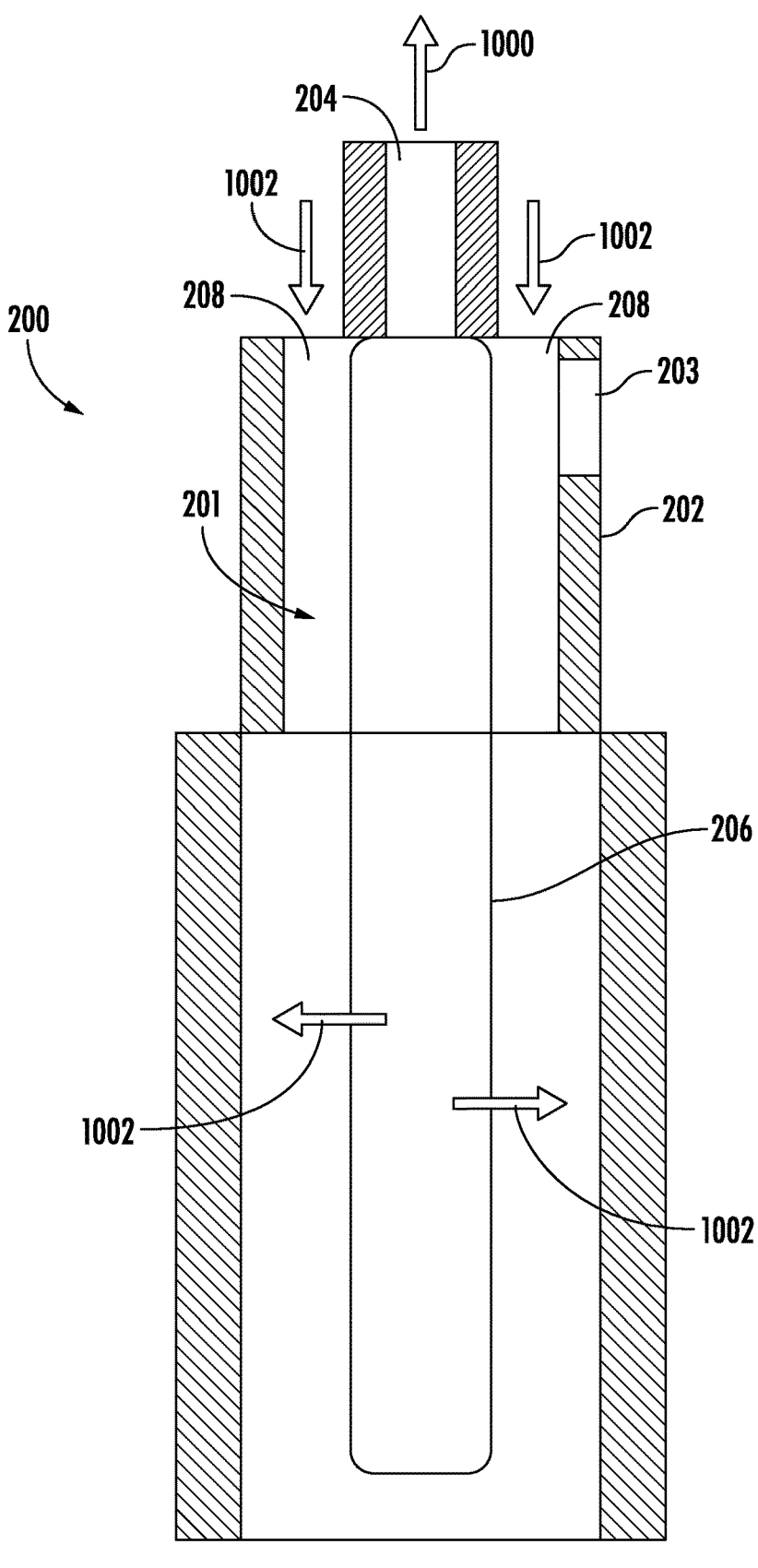
FIG. 4 provides a simplified section view of a water filter with an embedded wireless power receiver according to one or more embodiments of the present disclosure which may be incorporated into a refrigerator appliance such as the exemplary refrigerator appliance of FIG. 1.

In some embodiments, e.g., as illustrated in FIG. 4, the refrigerator appliance 100 includes a water filter 200 connected thereto. For example, the water filter 200 may be coupled to a water supply line (not shown) such that the water filter 200 receives a flow of water 1000, e.g., which may be referred to as raw or unfiltered water, from the water supply line and provides a flow of water 1002, e.g., filtered water, to a portion of the water supply line downstream of the filter 200 and/or various fixtures or components of the refrigerator appliance 100 such as an ice maker, water dispenser, etc. The water filter 200 may include a housing or body 202 which defines a liquid receiving space 201 with an inlet 204 opening through the housing 202 into the liquid receiving space 201 and an outlet 208 from the liquid receiving space 201. As illustrated in FIG. 4, unfiltered water 1000 may flow into filter 200 via inlet 204. The water may then pass through a filter medium 206, e.g., a membrane, activated carbon, or other suitable filter medium including combinations of more than one media, thereby producing filtered water 1002 which exits the water filter 200 via the outlet 208. In additional or alternative embodiments, filter medium 206 may include one or more filter electrodes (e.g., an anode, a cathode, etc.) receiving an electrical current to provide a filter action to the water. The one or more electrodes may be positioned within liquid receiving space 201. For instance, the filter electrodes may perform a deionization reaction within the water to remove impurities. As will be explained below, electricity for the filter electrodes may be supplied wirelessly from refrigerator appliance 100 to water filter 200.

Body 202 may define an electronics compartment 203. In detail, electronics compartment 203 may be fluidly separated from liquid receiving space 201. As shown schematically in FIG. 4, electronics compartment 203 may be formed in body 202 adjacent to liquid receiving space 201. Thus, a portion of body 202 may be positioned between liquid receiving space 201 and electronics compartment 203. Additionally or alternatively, a top portion, a bottom portion, opposite side portions, and a radially outward portion may be defined by body 202. Thus, electronics compartment 203 may be said to be positioned within a shell of water filter 200 (e.g., as defined by body 202).

One or more electronic components may be housed (e.g., positioned) within electronics compartment 203. Thus, the one or more electronic components (described below) may be fluidly isolated from liquid receiving space 201, and thus fluidly isolated from the flow of water received within liquid receiving space 201. Thus, electronics compartment 203 may define an electronics receiving space. In some instances, electronics compartment 203 may be selectively accessible (e.g., by a user). For instance, a liquid tight access door may be provided on body 202 of water filter 200 providing access to electronics compartment 203. According to other embodiments, electronics compartment 203 is sealed with respect to each of liquid receiving space 201 and an ambient atmosphere.

Figure 5:
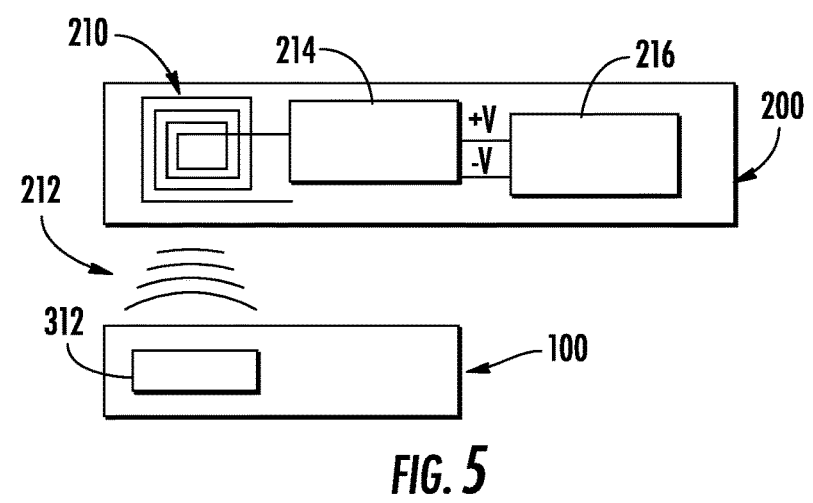
FIGS. 5 through 7 provide schematic diagrams showing wireless communication between the exemplary refrigerator appliance of FIG. 1 and the exemplary water filter of FIG. 4.
Figure 6:
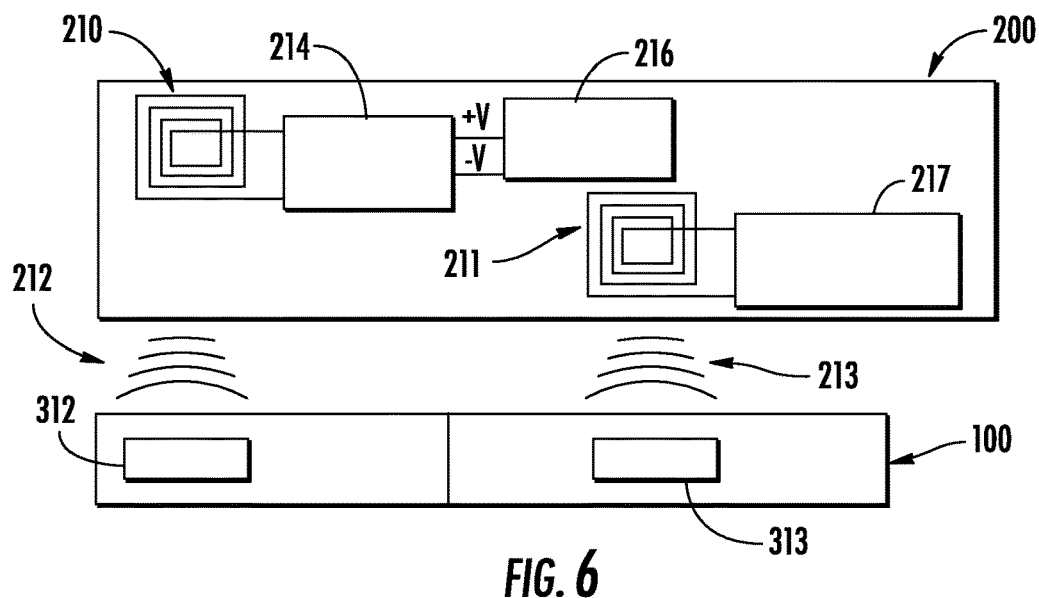
Figure 7:
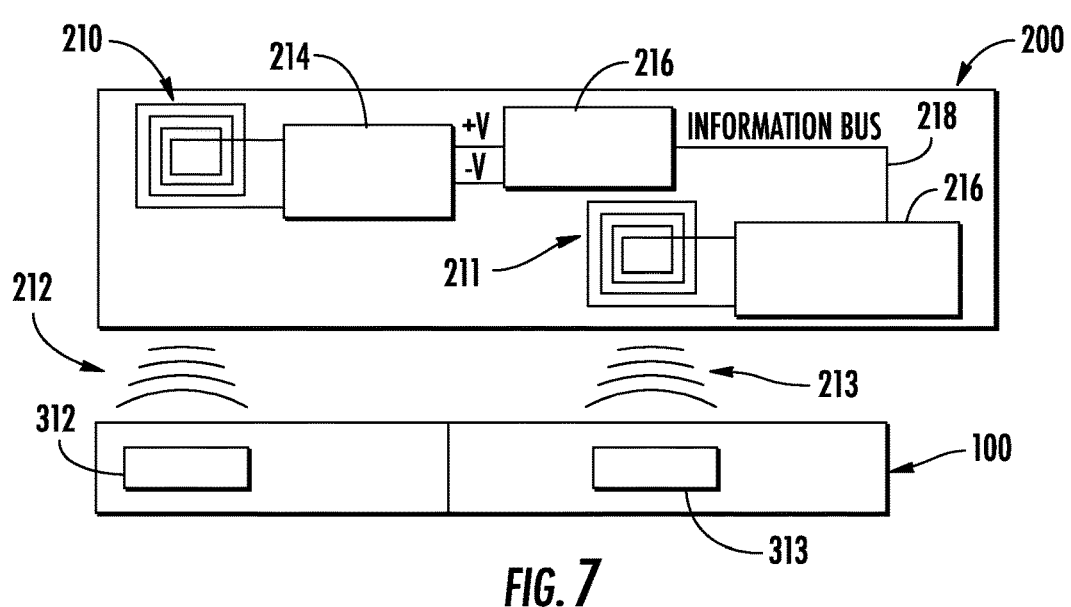

FIGS. 5 through 7 provide schematic representations of a water filter (e.g., water filter 200) and a refrigerator appliance (e.g., refrigerator appliance 100). In some embodiments, a wireless power transmitter 312 is provided to supply power to one or more electric devices within refrigerator appliance 100. In particular, wireless power transmitter 312 may be mounted on or within cabinet 120, in operable communication (e.g., wireless or contact-free communication) with water filter 200 to transmit an electromagnetic field thereto, which may then power one or more electronic components. For instance, wireless power transmitter 312 may transmit an electromagnetic field to an antenna (described below) provided within electronics compartment 203.

As shown, wireless power transmitter 312 may be physically spaced apart from water filter 200 at discrete portions (e.g., a docking port for water filter 200) of refrigerator appliance 100. When assembled, wireless power transmitter 312 may thus be wirelessly coupled to water filter 200 (e.g., without ever coming into direct or conductive electrical contact with water filter). In turn, an air gap may be maintained between the two. For instance, electronics compartment 203 of water filter 200 may be electrically sealed such that no electrical wires or busses pass through body 202. For example, when water filter 200 is installed within refrigerator appliance 100, no direct physical contact is made between components within electronics compartment 203 and wireless power transmitter 312. Advantageously, a potential failure or leak point may be avoided while still permitting power to be supplied to one or more electrical components provided within water filter 200.

Additionally or alternatively, wireless power transmitter 312 may operate (e.g., emit electromagnetic fields) according to one of a plurality of protocols. The plurality of protocols may include, for instance, a near-field communication (NFC) protocol, a Xi protocol, a radiofrequency identification (RFID) protocol, a laser protocol, a microwave protocol, or the like. It should be understood that the list of potential protocols is not exhaustive, and any suitable wireless protocol may be used. For instance, among the plurality of protocols, wireless power transmitter 312 may emit power charging signals (e.g., for wireless charging of electronic components), wireless authentication signals (e.g., to confirm that water filter 200 includes the capability to receive wireless charging), data transfer signals (e.g., wireless signals including data related to components of water filter 200), or the like.

With reference to FIGS. 5 through 7, an antenna 210 may be provided within the water filter 200. In particular, antenna 210 may be embedded in housing 202 of water filter 200. For example, in some embodiments, antenna 210 is positioned within electronics compartment 203. Antenna 210 may be configured to receive an electromagnetic field 212 (e.g., emitted by wireless power transmitter 312 within refrigerator appliance 100). Accordingly, antenna 210 may be configured to receive the electromagnetic field according to an associated protocol (e.g., through which wireless power transmitter 312 is operated), as would be understood.

The received electromagnetic field 212 may be converted to a usable signal via a power harvesting circuit 214. In detail, power harvesting circuit 214 may be provided within electronics compartment 203. Power harvesting circuit 214 may be electronically connected with antenna 210. Accordingly, electromagnetic field 212 may be transmitted to power harvesting circuit 214 via one or more electric connections. Power harvesting circuit 214 may then generate an electric current or voltage and transmit the electric current or voltage to an onboard controller. According to some embodiments, the onboard controller is integral with power harvesting circuit 214. However, a separate, dedicated controller may be included within water filter 200 (e.g., within electronics compartment 203).

Generally, wireless power transmitter 312 and antenna 210 may be configured to exchange an electromagnetic field that generates an electrical current. For instance, wireless power transmitter 312 may transmit an electromagnetic field (e.g., as initiated by controller 134) that is received at antenna 210 (which may also be referred to as a wireless power receiver). At antenna 210, an electrical current or voltage may be generated and, subsequently, transmitted to the onboard controller (e.g., through an on-board rectifying circuit or activation circuit). For instance, the electromagnetic field may induce an electrical current at power harvesting circuit 214 that can be received by the onboard controller (e.g., within power harvesting circuit). During operations, the onboard controller may be powered by power harvesting circuit 214.

As would be understood, the wireless power transmitter 312 and power harvesting circuit 214 may be a matched pair of resonant induction coils. Nonetheless, it is understood that any other suitable wireless power transmission method (e.g., inductive coupling, capacitive coupling, etc.) may be used.

As mentioned above, water filter 200 may include one or more electronic components 216. In detail, the one or more electronic components 216 may include a light emitting diode (LED), an electrode (e.g., a filter electrode for performing an ionizing reaction to the water), an electrode life sensor (e.g., to determine a remaining life or efficiency of the electrode), a water volume sensor, a water cycle sensor, or the like. For example, an electrode life sensor may include a voltage sensor on the electrode, a water quality sensor provided adjacent to the electrode, a chemical reaction sensor, or the like. The one or more electronic components may be operably coupled with power harvesting circuit 214 (e.g., via positive and negative voltage connections). Accordingly, the electrical current or voltage generated at power harvesting circuit 214 may be transmitted to the one or more electrical components 216 to provide power thereto. Additionally or alternatively, the one or more electrical components 216 may include a battery (e.g., a rechargeable battery). For instance, power harvesting circuit 214 may have a battery formed integrally therein. Thus, the electrical signal or voltage may be stored within the battery to be delivered to the one or more electrical components 216 at selected times.

Referring now to FIG. 6, according to some embodiments, water filter 200 may include a plurality of antennae. For instance, water filter 200 may include a first antenna 210 and a second antenna 211. First antenna 210 and second antenna 211 may be positioned apart from one another within electronics compartment 203. For instance, first antenna 210 may be provided at a first portion of electronics compartment 203 while second antenna 211 is provided at a second portion of electronics compartment 203 opposite the first portion. Additionally or alternatively, first antenna 210 may be electrically coupled with power harvesting circuit 214. Second antenna 211 may optionally be electrically coupled with power harvesting circuit 214. For instance, each of first antenna 210 and second antenna 211 may be separately coupled with power harvesting circuit 214 (e.g., to provide or receive electrical currents to or from power harvesting circuit 214 individually). As will be explained below, each of first antenna 210 and second antenna 211 may operate according to a different protocol and thus perform different functions with regard to power harvesting circuit 214.

First antenna 210 may be configured to receive a first electromagnetic field 212. First electromagnetic field 212 may be emitted from a first wireless power transmitter 312 according to a first protocol. As mentioned above, a plurality of protocols may be utilized to establish and perform wireless communication between refrigerator appliance 100 and water filter 200 (e.g., via first antenna 210 or second antenna 211). Water filter 200 may thus be configured to support multiple protocol communication via multiple antennae. For instance, second antenna 211 may be configured to receive a second electromagnetic field 213. Second electromagnetic field 213 may be emitted from a second wireless power transmitter 313 according to a second protocol. The second protocol may be different from the first protocol. Accordingly, when first antenna 210 operates according to the first protocol and second antenna 211 operates according to the second protocol, each of first antenna 210 and second antenna 211 may be positioned adjacent to each other within electronics compartment 203. Advantageously, a volume of electronics compartment 203 may be relatively small, increasing a volume of liquid receiving space 201 and allowing more water to be filtered in a quicker time.

According to some embodiments, second antenna 211 is coupled with a wireless authentication module 217. In detail, the one or more electronic components 216 may include a wireless authentication module 217 for confirming a wireless capability of water filter 200. As mentioned above, second antenna 211 may be configured to receive second electromagnetic field 213 according to a second protocol (e.g., different from first protocol 212 of first antenna 210). According to some embodiments, controller 134 of refrigerator appliance 100 may determine that water filter 200 is capable of receiving wireless power via communication with second antenna 211. Advantageously, refrigerator appliance 100 may avoid unnecessarily emitting electromagnetic field 212 (e.g., when no authentication is confirmed), thus saving energy and reducing operating costs of refrigerator appliance 100.

Referring now to FIG. 7, water filter 200 according to another embodiment may include an information bus 218. Information bus or information bus line 218 may provide a connection through with data may be transferred between the one or more electronic components 216. For one example, second antenna 211 operates according to a third protocol, the third protocol allowing wireless information transfer between water filter 200 (e.g., electronic components thereon) and refrigerator appliance 100. Data pertaining to one or more electronic components (e.g., filter life, water volume, etc.) may be transferred from a first electronic component 216 via the information bus 218. The data or information may then be transmitted to refrigerator appliance 100 via second antenna 211 (e.g., through second electromagnetic field 213) according to the third protocol.

According to still other embodiments, three or more antennae may be implemented into water filter 200 (e.g., within electronics compartment 203). Each antenna may be configured to operate according to a distinct protocol to avoid electromagnetic interference. For instance, a first antenna may establish a wireless authentication of water filter, a second antenna may allow for a transfer of power from refrigerator appliance 100 to water filter 200, and a third antenna may allow for data transfer (e.g., regarding one or more electronic components 216) between water filter 200 and refrigerator appliance 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:

a cabinet;

a food storage chamber defined in the cabinet;

a filter dock provided within the food storage chamber;

a transmitter power coil provided at the filter dock; and a water filter removably coupled to the filter dock, the water filter comprising:

a body comprising an outer shell, the outer shell forming a liquid receiving space therewithin and defining an electronics compartment fluidly separated from the liquid receiving space, the body comprising an inlet opening through the body into the liquid receiving space and an outlet from the liquid receiving space, wherein a portion of the outer shell is positioned between the liquid receiving space and the electronics compartment;

a filter material positioned entirely within the liquid receiving space to filter water therethrough;

a first antenna attached to the body and positioned entirely within the electronics compartment, the first antenna facilitating a wireless communication between the refrigerator appliance and the water filter;

a power harvesting circuit attached to the body and positioned entirely within the electronics compartment, the power harvesting circuit being operably connected with the first antenna; and one or more electronic components positioned entirely within the electronics compartment, the one or more electronic components operably coupled to the power harvesting circuit, wherein the first antenna wirelessly receives a first electromagnetic field from the transmitter power coil to provide power to the one or more electronic components via the power harvesting circuit.

2. The refrigerator appliance of claim 1, wherein the first antenna is configured to receive the first electromagnetic field according to a first predetermined protocol.

3. The refrigerator appliance of claim 2, wherein the first predetermined protocol comprises a near field communication (NFC) protocol, a Xi protocol, a radio-frequency identification (RFID) protocol, a laser protocol, or a microwave protocol.

4. The refrigerator appliance of claim 2, wherein the one or more electronic components comprises a light emitting diode (LED), a filter electrode, an electrode life sensor, a water volume sensor, or a water cycle sensor to sense an amount of the water that has passed through the filter material.

5. The refrigerator appliance of claim 2, further comprising:

a second antenna positioned entirely within the electronics compartment, the second antenna facilitating a second wireless communication between the refrigerator appliance and the water filter, wherein the second antenna is configured to receive a second electromagnetic field according to a second predetermined protocol, the second predetermined protocol being different from the first predetermined protocol.

6. The refrigerator appliance of claim 5, wherein the second antenna is a wireless authentication antenna to instruct the transmitter power coil to emit the first electromagnetic field.

7. The refrigerator appliance of claim 5, wherein the second antenna is a wireless data antenna configured to transmit and receive data from the refrigerator appliance.

8. The refrigerator appliance of claim 5, wherein the second antenna is positioned within the electronics compartment.

9. The refrigerator appliance of claim 1, wherein the electronics compartment is fluidly sealed with respect to an ambient atmosphere and the liquid receiving space.

\* \* \* \* \*